United States Patent [19]

Perrin

[11] 4,300,489

[45] Nov. 17, 1981

[54] PIPE CLOSING DEVICE

[75] Inventor: Marc Perrin, Genlis, France

[73] Assignee: Cycles Peugeot, Valentigney, France

[21] Appl. No.: 178,412

[22] Filed: Aug. 15, 1980

Related U.S. Application Data

[63] Continuation of Ser. No. 965,020, Nov. 30, 1978, abandoned.

[30] Foreign Application Priority Data

Dec. 5, 1977 [FR] France ................................ 77 36551

[51] Int. Cl.³ .......................................... G05D 11/03
[52] U.S. Cl. .......................... 123/73 AD; 137/101.27;
137/114; 137/554; 137/428; 137/432; 251/65;
116/277
[58] Field of Search ..................... 137/87, 101.27, 114,
137/428, 430, 432, 554, 556; 123/73 AD;
116/277; 251/65

[56] References Cited

U.S. PATENT DOCUMENTS

| 2,497,375 | 2/1950 | Seguin et al. | 137/554 |
| 2,533,491 | 12/1950 | McMahon et al. | 116/277 |
| 3,105,512 | 10/1963 | Lyall et al. | 251/65 |
| 3,233,625 | 2/1966 | Pase | 251/65 |
| 3,467,135 | 9/1969 | Muskalla | 251/65 |
| 3,741,239 | 6/1973 | Riddiford | 251/65 |
| 3,921,662 | 11/1975 | Hauffe et al. | 251/65 |
| 3,980,457 | 9/1976 | Smith | 251/65 |
| 4,069,835 | 1/1978 | Stadler | 137/98 |
| 4,142,486 | 3/1979 | Schreier | 123/73 AD |

FOREIGN PATENT DOCUMENTS

| 1059678 | 6/1959 | Fed. Rep. of Germany | 137/87 |
| 1096560 | 6/1955 | France | 137/87 |

*Primary Examiner*—H. Jay Spiegel
*Attorney, Agent, or Firm*—Sughrue, Mion, Zinn, Macpeak and Seas

[57] ABSTRACT

The device is especially intended for a pipe supplying a fluid which must be supplied, simultaneously or alternately, with another fluid. The device comprises a tank for a control fluid which surrounds the vertical supply pipe and in which a permanent magnet moves in accordance with the amount of control fluid contained in the tank. The magnet shifts a valve member inside the supply pipe so that the valve member closes the latter in one of the end positions of the magnet. The magnet is rigid with a float which freely extends around the supply pipe. The device can in particular ensure that fuel is supplied to an engine only if oil is supplied to the latter.

6 Claims, 1 Drawing Figure

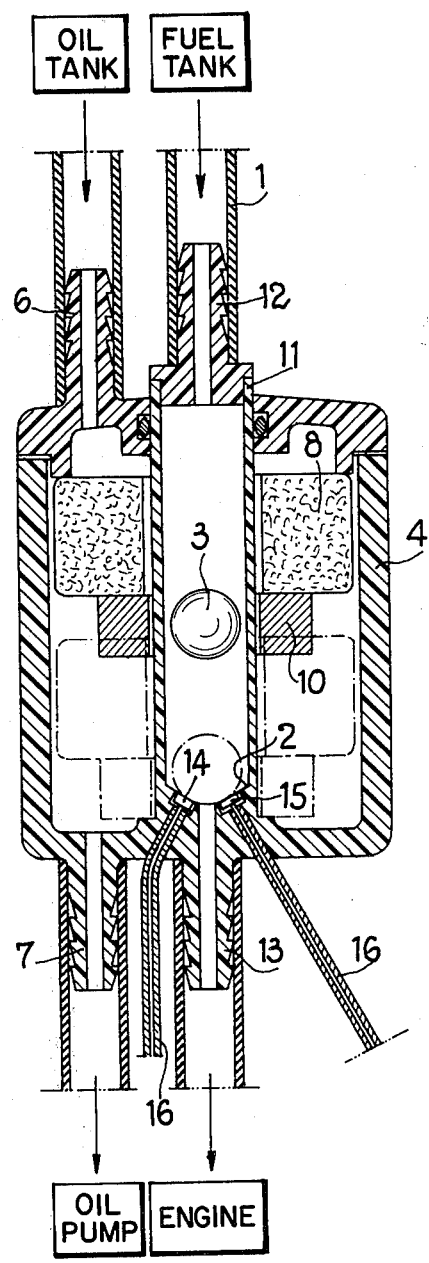

PIPE CLOSING DEVICE

This is a continuation of application Ser. No. 965,020 filed Nov. 30, 1978, is now abandoned.

The present invention relates to a device for closing a fluid pipe as a function of the flow or of the presence of another fluid, which is more particularly intended for the supply of a fluid which must be mixed with another fluid and is supplied simultaneously with this fluid at the same point or at a different point or, on the contrary, supplied alternately with this fluid.

A typical example of the flow of fluids of this type is formed by the supply of petrol and oil of two-stroke engines which have a separate lubrication and in particular engines of two-wheeled vehicles. In these engines, the lubrication is achieved by supplying oil in the carburettor or in the crank-case by means of a pump driven by the engine. The vehicles therefore usually comprise an oil tank and a petrol tank which are separate so that the engine can continue to operate without lubrication when the oil tank is empty, which is a serious drawback and may result in the destruction of the engine.

There has been proposed, in order to overcome this drawback, the use of a mixer in which the supply of petrol is controlled by the pressure of the oil, but this requires maintaining the oil at sufficient pressure and results in the automatic closing of the petrol supply when the engine stops, until the oil once again is supplied under pressure. Moreover, such an arrangement is only applicable in the case where the two fluids are intended to be mixed.

An object of the present invention is to provide a closing device which may be adapted to structures in which the fluids are not intended to be mixed and which ensures the closure of the fluid pipe to be controlled in accordance solely with the presence of the second fluid, irrespective of the pressure of the latter.

According to the invention, there is provided a device for closing a fluid pipe in accordance with the flow of another fluid, comprising a tank which is inserted in the circuit of the second fluid and through which the pipe of the fluid to be controlled extends and in which a permanent magnet moves in accordance with the amount of control fluid contained in the tank, and a valve member mounted inside the pipe, but constantly subjected to the attraction of the permanent magnet, which closes said pipe when the magnet is in one of its extreme positions and opens it as soon as the magnet leaves this extreme position.

The pipe is consequently closed automatically upon the supply of the control fluid or upon the stopping of this supply, depending on the desired operational mode, without contact between the fluids.

As the flow, or even the presence of the fluid in the tank, is the sole parameter controlling the valve member, the latter leaves its seat as soon as the fluid once again moves the magnet.

In the case of a supply of petrol and oil of a two-stroke engine, the permanent magnet causes the closure of the valve member of the petrol pipe when the tank is empty, that is to say when the control oil flowing through this tank has been used up. The engine is then stopped and cannot start up again, which provides an effective safety measure. On the other hand, so long as the oil is present, the engine can be stopped and started up again immediately as quickly as desired.

The ensuing description of one embodiment given merely by way of example and shown in axial sectional view in the single FIGURE of the accompanying drawing, will show the features and advantages of the invention.

As shown in the FIGURE, the pipe 1 through which flows the fluid whose flow must be regulated is provided with a check ball valve member whose seat 2 is formed by an inner shoulder of this pipe and whose ball 3 is a steel ball whose diameter is slightly less than the inside diameter of the pipe 1. Mounted around this valve is a tank or vessel 4 which is coaxial with the pipe 1 and provided with a nozzle 6 for the entry of fluid and a fluid outlet nozzle 7 in the extension of each other and located respectively on the two opposed walls of the tank through which the pipe 1 extends. Inside the tank, a float unit, comprising a float 8 of annular shape and a permanent magnet 10 rigid with the float, freely slides around the pipe 1. The ball 3 is constantly subjected to the attraction of the permanent magnet 10 since it is of steel and is thus maintained in the centre of the pipe 1 and shifted by the movement of the magnet.

Consequently, when the tank 4 is full, which occurs in particular when the control fluid flows between the nozzle 6 and the nozzle 7, the float 8 is urged toward the upper end of the tank 4 and raises the magnet 10, which maintains the ball 3 in the position spaced away from the seat 2 shown in the FIGURE. Grooves are usually formed in the float to permit the fluid to continue to flow when the float is in this extreme position.

On the other hand, when the supply of control fluid to the nozzle 6 ceases, the tank 4 is emptied and the float 8 moves downwardly and shifts the magnet 10 downwardly. The ball 3 is brought against the valve seat 2 and closes the pipe 1. The flow of the fluid in this pipe is consequently immediately stopped.

Such a device is particularly adapted to the closure of the petrol supply pipe of a two-stroke engine the lubrication of which is achieved by the supply of oil in the carburettor or in the crank-case.

The pipe 1 is then the petrol supply pipe which is connected in its upper part to the petrol tank and in its lower part to the carburettor. Mounted in this pipe 1, is a cylindrical end member 11 which is extended at both ends by nozzles 12 and 13 which are respectively the petrol inlet and outlet. The inner passage of each of these nozzles 12, 13 has a diameter less than the diameter of the pipe 1 which is itself less than cylindrical end member 11 so that an inner shoulder is formed at the junction between the nozzle and the member 11, the lower shoulder forming the seat 2.

The end member 11 is rigid with the body of the tank 4 which is coaxial therewith and whose nozzles 6 and 7 are respectively connected to the oil tank and to the lubrication pump. When the oil flows normally toward this pump, the tank 4 is filled so that the ball 3 is held away from its seat. On the other hand, as soon as the oil has been used up, the ball 3 is returned into contact with the seat 2 and the supply of petrol is stopped, which constitutes a safety measure for the engine.

The seat 2 may possibly comprise, as shown in the FIGURE, two studs 14 and 15 from which electric conductors 16 extend, these conductors being connected to a source of current and to a signalling means. The studs 14 and 15 are spaced apart a distance less than the diameter of the ball 3 so that the latter closes the signal actuating electric circuit when it is in the position for closing the valve. The operator, or possibly the driver of the vehicle, is in this way warned of the absence of oil.

It will be understood that the device of the invention may be employed in other applications. For example, it may close the control valve of the pipe 1 when the fluid is present in the control pipe, the operation of the float or the position of the seat 2 being reversed. In this way, it may be employed for permitting the passage of the fluid in the pipe 1 when the fluid flows between the nozzles 6 and 7 or, on the contrary, as soon as the control fluid has ceased to flow.

In any case, there is obtained an extremely reliable automatic closure or opening without any risk of wear or seizure of the control means and no maintenance is necessary.

Such a device is of interest for example in the chemical industry for regulating the supply of boilers with liquid or gaseous fuel and for the safety of operation of four-stroke engines in the same way as two stroke-engines by ensuring the closure of the petrol supply in the event of a lack of oil or cooling liquid.

This device may be modified in accordance with its applications, for example the tank 4 may be mounted on horizontal pipes, the float may be replaced by any other means for detecting the presence of the fluid in the tank and any other means for shifting the permanent magnet.

Having now described my invention what I claim as new and desire to secure by Letters Patent is:

1. A device for closing a pipe for a first liquid when a second liquid ceases to flow, comprising means defining a liquid circuit for the second liquid, the circuit including a tank having an upper end and a lower end and a lateral wall, a pipe for the first liquid and extending through the tank, a float unit which is disposed in the tank and is movable between said upper and lower ends of the tank and is lighter than the volume of the second liquid displaced thereby and is consequently capable of floating on the second liquid and has a level constantly related to the level of the second liquid irrespective of the flow of the second liquid, means defining a passage for liquid between the float unit and the lateral wall of the tank, the tank having first inlet means adjacent said upper end of the tank and first outlet means adjacent said lower end of the tank for the second liquid so that the pressure of the second liquid has no effect on the position of the float unit in the tank when the float unit is in said lower position, the float unit comprising a permanent magnet, a check valve member freely movable inside the pipe, the pipe having second inlet means adjacent said first inlet means and second outlet means adjacent said first outlet means, a valve seat disposed inside the pipe and located adjacent said lower end of the tank, the valve member being biased against the valve seat under the force of gravity and being responsive to the attraction of the permanent magnet and constantly subjected to said attraction and being applied against said seat and closing said pipe when the float unit is adjacent said lower end of the tank and spaced away from said seat and opening the pipe as soon as the float unit leaves said lower end of the tank.

2. A device as claimed in claim 1, wherein the pipe is substantially vertical.

3. A device as claimed in claim 1 or 2, wherein the magnet is annular and coaxial with the pipe, the valve member is a ball which has a diameter less than the inside diameter of the pipe and is maintained in the center of the pipe by the magnet.

4. A device as claimed in claim 1 or 2, wherein the tank has two opposed walls through which walls the pipe extends and the upper inlet and the lower outlet are disposed respectively on the opposed walls of the tank.

5. A device as claimed in claim 1 or 2, further comprising two electric studs combined with the seat, one of which studs is for connection to a source of electricity and the other of which studs is for connection to signalling means, the valve member being electrically conductive so as to interconnect the studs in the pipe-closing position of the valve member.

6. A safety closing device in combination with an engine having a lubricating oil circuit comprising an oil tank and an oil pump, and a fuel supply pipe, for interrupting the supply of fuel to the engine when there is no oil in said tank and circuit, the device comprising a vessel having an upper end and a lower end and a lateral wall, an upper/oil first inlet in constant communication with the oil tank and circuit and a first outlet in a lower part of the vessel for connection to an inlet of the pump, the vessel extending around the supply pipe, a float unit comprising a permanent magnet and a float rigid with the permanent magnet, the float unit being disposed in said vessel around the pipe to move in a substantially vertical direction between said upper end of the vessel and said lower end of the vessel, means defining a passage for liquid between the float unit and said lateral wall of the vessel, the float unit being lighter than the volume of the oil displaced thereby and consequently being capable of floating on the oil and having a level in the vessel which is constantly related to the level of the oil irrespective of the flow of the oil, a valve seat in the pipe and a check valve member cooperative with the valve seat for closing the pipe in a lower position of the valve member and opening the pipe in an upper position of the valve member the pipe having a second inlet adjacent said first inlet and a second outlet adjacent said first outlet, the valve member being biased against the seat under the force of gravity and being responsive to attraction of the magnet so that when no oil is in the vessel and the magnet and float are adjacent said lower end of the vessel, the valve member bears against the valve seat and as soon as oil is in the vessel the float and the magnet move away from said lower end of the vessel and the magnet shifts the valve member away from the seat and opens the pipe.

* * * * *